United States Patent Office 2,697,105
Patented Dec. 14, 1954

2,697,105

PURIFICATION OF CHOLIC ACID

Harold G. Baker and Stephen M. Creighton, Toronto, Ontario, Canada, assignors to Canada Packers Limited, Toronto, Ontario, Canada No Drawing. Application July 23, 1951,
Serial No. 238,195

6 Claims. (Cl. 260—397.1)

This invention relates to the purification of cholic acid, and more particularly to the recovery of cholic acid from a bile acid material containing cholic acid which has been precipitated after saponification and by subsequent acidification of concentrated bile or ox gall.

The successful isolation of cholic acid in substantially pure form from the mixture of bile acids produced by the conventional saponification of bile and precipitation of bile acids has heretofore met with many difficulties.

In United States Patent 2,346,239 and United States Patent 2,438,232, there is described a method of preparing cholic acid by treating bile acids, precipitated by acidification of the saponification product of bile, with an organic solvent for cholic acid, such as methyl alcohol, ethyl alcohol or amyl alcohol in sufficient amounts to dissolve the bile acids. Subsequently an organic liquid, such as toluene or benzene, in which cholic acid is insoluble and which is miscible with the solvent is added. Precipitation of impure cholic acid then takes place and the precipitated material may be further purified by usual methods. The process is carried out in the presence of substantial amounts of water even when the aqueous acid solution is separated prior to treatment with alcohol. Also, water immiscible alcohols are preferred.

According to the process described in the above-mentioned patents, the bile acid material which is treated is in the form of a tarry mass which has been separated from the water and other products formed by the saponification of bile. The tarry mass is not dried and still contains substantial amounts of water. Substantial quantities of the organic solvent and of the other organic liquids are required. The quantity of the alcohol or other solvent is in excess of 1% of the bile and preferably between 4% and 7%. That is to say, the amount of alcohol or similar solvent is preferably in the proportion of about 40 to 70 ml. of alcohol to each 40 grams of crude cholic acid in the bile. By the term "crude cholic acid" as employed herein is meant cholic acid substantially free of desoxycholic acid but associated with fatty acids and pigments such that the pure cholic acid content of the crude cholic acid is between approximately 80% and 95%. The other organic liquid is present in a quantity up to approximately four times the quantity of the solvent. Under these conditions, desoxycholic acid and impurities such as fatty acids and bile pigments tend to remain in solution and part of the cholic acid is precipitated from the solvent alcohol in a form requiring further purification. About 75 grams of purified cholic acid are obtained from each gallon of bile or 1.98% based on the total weight of average beef bile which usually contains about 4.4% of cholic acid, and it is an object of this invention to provide an improved method by which a much higher yield of cholic acid may be obtained.

We have found that a much higher yield than was hitherto possible by any known method may be obtained by the process of the present invention. In the present process the amount of alcohol employed is not sufficient to dissolve the cholic acid. This is in contradistinction to the method described in the aforesaid United States patents. Also, only the lower aliphatic alcohols, i. e., alcohols up to and including normal butyl but not iso-butyl alcohol may be employed, higher alcohols such as amyl alcohol and hexanol not being usable. By way of explanation it is believed that a reaction takes place between cholic acid and the lower alcohols to form a complex, according to one of the following equations, in which R represents a lower alkyl group such as methyl, ethyl, normal propyl, iso-propyl, or normal butyl.

$$C_{24}H_{40}O_5 \cdot \tfrac{1}{2} H_2O + ROH = C_{24}H_{40}O_5 \cdot ROH + \tfrac{1}{2} H_2O$$
$$C_{24}H_{40}O_5 + ROH = C_{24}H_{40}O_5 \cdot ROH$$

It is further believed that during the formation of the complex impurities such as fatty acids and pigments are exposed to the solvent action of a fatty acid solvent also employed and a cholic acid-alcohol complex precipitates so as to leave a major portion of the impurities in solution.

In order that a sufficiently pure product in high yield be obtained, it is necessary that the bile acid material to be treated with the lower alcohol be fully separated from the acidified saponification mixture and at least partially dried to remove most of the water content. Preferably, the starting material is carefully dried to remove substantially all water apart from combined water in the hemihydrate $C_{24}H_{40}O_5 \cdot \tfrac{1}{2} H_2O$ and then pulverized. Furthermore, the alcohol employed should be of low water content to aid in keeping the amount of water in the process as low as possible.

The process is carried out according to the invention by treating the separated and dried bile acid material with the appropriate alcohol in conjunction with a solvent for the fatty acids and pigments in the bile acid product. The solvent must be an organic liquid in which the cholic acid-alcohol complex is substantially insoluble and which is miscible with the alcohol employed. In order to avoid undue dilution of the alcohol, and for reason of economy the quantity of the fatty acid solvent is preferably kept to the minimum required to obtain a workable consistency in the mass. Under these conditions when the mixture of the alcohol and the fatty acid solvent, which may be, for example, toluene or benzene, is brought into contact with the dried bile acid material, a crystalline precipitate containing the cholic acid and desoxycholic acid, if still present, is obtained, the fatty acid and pigments largely going into solution.

The most suitable alcohol for use in the process according to the invention, and the one which produces the highest yield, is methanol. Other lower alcohols which are suitable but less advantageous are, in the order of decreasing effectiveness, ethanol, n-propanol, iso-propanol and n-butanol. The relative effectiveness of the various lower alcohols which may be used shows a definite trend in the direction of decreasing effectiveness as the molecular weight is increased and starting with butyl alcohol there is a marked difference between the effectiveness of straight chain and branched chain alcohols.

Any organic liquid in which cholic acid is insoluble and fatty acids and bile pigments are soluble, and which is miscible with the alcohol employed, may be used as the fatty acid solvent. For instance, ethers, halogenated aliphatic hydrocarbons, aromatic hydrocarbons and halogenated aromatic hydrocarbons may be employed in the process according to the invention. Particularly useful examples are toluene, ethylene dichloride and chlorobenzene.

Excellent results are obtained according to the invention by first separating the cholic acid from desoxycholic acid in the precipitated mixture of bile acids resulting from acidification of the saponified bile mixture. This separation may be accomplished by any suitable method; one method is disclosed in United States application Serial No. 131,500 filed December 6, 1949, and United States application Serial No. 190,674 filed October 18, 1950, both in the name of Laurene O. Paterson, and consists of treatment of the crude bile acids with aqueous morpholine or another similar basic substance at a pH of about 5.9 to 6.1. The Paterson process, in which the amount of morpholine employed is 12 to 13.5 ml. of morpholine per 100 g. of crude bile acids suspended in about 650 ml. of water so that the cholic acid, as well as the fatty acids and bile pigments, goes into solution while the desoxycholic acid remains undissolved, results in the separation of the desoxycholic acid. After filtering out the desoxycholic acid, the filtrate is acidified to precipitate the cholic acid and impurities. After being dried and pulverized, this bile acid material, which contains 80% to 95% cholic acid and which is referred to herein as crude cholic acid, is treated according to the invention with the mixture of the alcohol and the organic solvent for the fatty acids to obtain a high yield of a crystalline precipitate of purified cholic acid.

If the cholic and desoxycholic acids in the bile acid mixture are not separated before the treatment according to the invention the crystalline precipitate obtained contains the desoxycholic acid along with cholic acid and a subsequent separation of the two bile acids in the product is necessary. This can be accomplished by the Paterson process above discussed. Whether it is desired to carry out the separation of the two bile acids before or after the purification step according to the invention is merely a matter of choice, but the invention will be mainly described as applied to the crude cholic acid which results from the prior separation of cholic acid from desoxycholic acid, it being understood that the treatment, including the amounts of alcohol and fatty acid solvent, is the same when desoxycholic acid is present. That is to say the amounts of alcohol and fatty acid solvent are based on the crude cholic acid present.

The preferred amount of alcohol for use in the method according to the invention is about two moles of alcohol per mole of cholic acid in the material being treated. This is about 7.5 ml. of methanol per 40 grams of crude cholic acid and about 18 ml. per 40 grams of crude cholic acid with n-butanol. The cholic acid may be in the form of the hemihydrate when the crude cholic acid is dried under atmospheric pressure at a temperature below 80° C., as normally will be the case. The amount of the fatty acid solvent which is used is advantageously about 1 milliliter of the solvent per gram of crude cholic acid or 40 ml. per 40 grams of crude cholic acid. Generally speaking, the amount of the fatty acid solvent is determined, as indicated above, by the minimum amount required to obtain a workable consistency. For example, it has been found that particularly advantageous proportions of methanol and the solvent for treating 40 grams of crude cholic acid, which has been separated from desoxycholic acid and air dried at 70° C. under atmospheric pressure, are 7.5 milliliters of methanol and 40 milliliters of toluene, or a ratio of methanol to toluene of 1:5.34.

While the preferred amounts of alcohol and fatty acid solvent are those given above, the minimum amount of alcohol which produces effective results is approximately 1 mole per mole of cholic acid in the material being treated irrespective of the alcohol employed. This is approximately 4 ml. for methanol and approximately 9 ml. of n-butanol per 40 grams of crude cholic acid. However, the upper limit of the amount of alcohol for effective results is determined largely by the volume of alcohol and is approximately 30 ml. of alcohol per 40 grams of crude cholic acid which, for example, corresponds to approximately 8 moles of methanol and 3.3 moles of n-butanol per mole of cholic acid.

The minimum amount of fatty acid solvent is approximately 40 ml. per 40 grams of crude cholic acid and in general this amount should be increased substantially proportional to the amount of alcohol as the amount of alcohol is increased above 2 moles per mole of crude cholic acid so as to reduce the loss of cholic acid due to its solubility in the mixture. Relatively larger amounts of fatty acid solvent may be employed but no advantages are obtained thereby. The range of fatty acid solvent for effective and economical operation of the process and depending upon the amount and nature of the alcohol employed is, therefore, from about 40 ml. to 160 ml. per 40 grams of crude cholic acid, the preferred amount of fatty acid solvent being 40 ml. per 40 grams of crude cholic acid employed with 2 moles of alcohol per mole of cholic acid in the crude cholic acid. It will be noted that the ratio of alcohol to fatty acid solvent may vary over a considerable range, i. e., from about 1:40 to 1:1⅓, the preferred ratio being about 1:5⅓. In general it may be stated that the amount of alcohol is insufficient to dissolve the cholic acid in the material being treated even in the absence of the fatty acid solvent and that the amount of such solvent is sufficient to dissolve the fatty acids in such material.

The preferred method of carrying out the process according to the invention consists in mixing the dried and pulverized crude cholic acid with toluene in the proportion of about 1 milliliter of the latter to each gram of the former, the toluene containing an amount of methanol to provide a molar ratio of cholic acid to methanol of approximately 1 to 2, allowing the mixture to stand at room temperature over night, then removing the crystalline precipitate containing cholic acid in a centrifuge. Under these conditions there is obtained a product having the commercially specified melting point of 195° C. or higher in yields up to about 4% based on the total weight of bile or about 40% based on the total weight of inspissated bile containing about 44% of cholic acid. This is a yield of about 90% based on the total weight of crude cholic acid or about 91% based on the cholic acid content of the bile and is a notable improvement over prior art methods. In certain of the tables given below, the run identified as number 74–10 exemplifies the preferred conditions under which the method according to the invention is carried out. This was a particularly good run since a yield of 92.5% based on the weight of crude cholic acid was obtained and the product had a melting point of 195.5 to 198.5° C.

The tables following will demonstrate the preferred proportions and significant factors involved in the carrying out of the invention.

A series of experimental runs using different alcohols was made to indicate the alcohols which are applicable to the method according to the invention and their relative effectiveness; the results of the experiments are set out in Table I. In each case, 7.5 milliliters of the alcohol and 40 milliliters of toluene were used to treat 40 grams of crude cholic acid, the latter being obtained from saponified bile by acidification, separation of desoxycholic acid from the bile acid by the morpholine (Paterson) process described above, and acidification, followed by drying of the crude cholic acid.

*Table I*

| Run | Alcohol Used | Recovery Wt. (g.) | Recovery Percent | Melting Point (° C.) |
|---|---|---|---|---|
| 192–1 | Methyl | 34.5 | 86.3 | 193–200 |
| 192–2 | Ethyl | 31.2 | 78.0 | 195–199 |
| 192–6 | n-Propyl | 35.2 | 88.0 | 193–196 |
| 192–7 | iso-Propyl | 34.3 | 85.8 | 192–196 |
| 60–199 | n-Butyl | 34.7 | 86.8 | 191–194 |
| 192–3 | iso-Butyl | 34.4 | 86.0 | 161–164 |
| 192–4 | tertiary-Butyl | 34.6 | 86.5 | 160–162 |
| 192–5 | tertiary-Amyl | 35.0 | 87.5 | 149–161 |
| 192–8 | Cyclo-hexanol | 35.8 | 89.5 | 159–163 |

For each alcohol used in the runs of Table I tests were made to determine the extent of crystal transformation from the cholic acid hemihydrate to an alcohol complex. The measurement of neutralization equivalents of the products appears to indicate that the crystal transformation is complete in the case of methanol, less complete in the cases of ethyl, n-propyl, iso-propyl and n-butyl alcohols, and appears to be non-existent in the case of the higher alcohols iso-butyl, tertiary butyl, tertiary amyl and cyclo-hexanol.

Another series of experimental runs was carried out in order to demonstrate the wide variety of fatty acid solvents which may be used in carrying out of the invention. In each run, 7.5 milliliters of methanol and 40 milliliters of the solvent were used to treat 40 grams of dried crude cholic acid. The results are given in Table II:

*Table II*

| Run | Solvent Used, Type | Recovery Wt. (g.) | Recovery Percent | Melting Point (° C.) |
|---|---|---|---|---|
| 193–1 | Ethyl Ether | 33.9 | 84.8 | 196–200 |
| 198–1 | Di-iso-propyl ether | 34.9 | 87.4 | 195–197 |
| 193–2 | Ethylene dichloride | 33.9 | 84.8 | 195–200 |
| 198–2 | Trichloroethylene | 32.9 | 82.3 | 196–198 |
| 198–3 | Perchloroethylene | 33.7 | 84.3 | 196–200 |
| 193–3 | Benzene | 34.2 | 85.5 | 196–198 |
| 74–10 | Toluene | 37.0 | 92.5 | 195.5–198.5 |
| 74–49 | Bromobenzene | 36.2 | 90.5 | 195.0–197.0 |
| 74–50 | Chlorobenzene | 36.1 | 90.4 | 195.4–196.8 |
| 74–52 | Xylene | 36.5 | 91.2 | 194.6–196.2 |
| 193–4 | Acetone | 30.2 | 75.5 | 192–195 |
| 193–5 | Methyl Cellosolve | 18.2 | 45.5 | 196–200 |

The low yields found when acetone or methyl Cellosolve in which cholic acid is relatively soluble, were used demonstrates the requirement that the fatty acid solvent used must be one in which cholic acid is substantially insoluble.

Table III illustrates the effect of increasing the proportion of the mixture of the alcohol and the fatty acid solvent with respect to the weight of crude cholic acid. In each run, 40 grams of dried crude cholic acid were used:

*Table III*

| Run | Vol. of Methanol (ml.) | Vol. of toluene (ml.) | Recovery | | Melting Point (° C.) |
|---|---|---|---|---|---|
| | | | Wt. (g.) | Percent | |
| 74-10 | 7.5 | 40.0 | 37.0 | 92.5 | 195.5-198.5 |
| 74-11 | 15.0 | 80.00 | 35.3 | 88.4 | 197.0-200.0 |
| 74-12 | 22.5 | 120.0 | 33.8 | 84.4 | 198.0-201.0 |
| 74-13 | 30.0 | 160.00 | 31.8 | 79.5 | 198.5-201.0 |
| 74-14 | 37.5 | 200.0 | 28.8 | 69.5 | 199.0-201.0 |

It will be noted that there is a noticeable falling off of yield as the proportion of the mixed organic liquids is increased.

Table IV illustrates the same effect when an alcohol of higher molecular weight is employed, the amount of crude cholic acid being 40 grams in each run:

*Table IV*

| Run | Vol. of n-Butanol (ml.) | Vol. of Toluene (ml.) | Recovery | | Melting Point (° C.) |
|---|---|---|---|---|---|
| | | | Wt. (g.) | Percent | |
| 74-53 | 18.0 | 40.0 | 33.1 | 82.5 | 193.0-195.0 |
| 74-57 | 36.0 | 80.0 | 30.1 | 75.1 | 195.0-196 |
| 74-58 | 54.0 | 120.0 | 29.0 | 72.5 | 196.0-197.4 |
| 74-59 | 63.0 | 160 | 27.8 | 69.5 | 196.2-197.8 |

The series of experimental runs set out in Table V demonstrates that the proportion of the fatty acid solvent to the alcohol may be increased without affecting the effectiveness of the process according to the invention; normally, however, the minimum amount which gives effective results will be employed for economic reasons and in order to reduce the required reaction time. Table V is based on a total reaction time of 24 hours; as may be expected, the reaction rate is increased to some extent when the ratio of fatty acid solvent to alcohol is kept down to the preferred value. The weight of dried crude cholic acid was 40 grams and the volume of methanol was 7.5 milliliters, for each run:

*Table V*

| Run | Vol. of Toluene (ml.) | Ratio of Methanol to Toluene | Recovery | | Melting Point (° C.) |
|---|---|---|---|---|---|
| | | | Wt. (g.) | Percent | |
| 74-10 | 40.0 | 1:5.34 | 37.0 | 92.5 | 195.5-198.5 |
| 74-16 | 60.0 | 1:8 | 37.2 | 93.0 | 195.5-200.6 |
| 74-17 | 80.0 | 1:10.65 | 37.1 | 92.7 | 196.0-198.5 |
| 74-18 | 120.0 | 1:16 | 37.0 | 92.5 | 196.0-198.5 |

Table VI illustrates the decrease in yield as the volume of methanol is increased while that of the fatty acid solvent is maintained constant. In each run, 40 grams of crude cholic acid were employed:

*Table VI*

| Run | Vol. of Toluol (ml.) | Vol. of Methanol (ml.) | Recovery | | Melting Point (° C.) |
|---|---|---|---|---|---|
| | | | Wt. (g.) | Percent | |
| 74-60 | 40.0 | 7.5 | 36.6 | 91.5 | 194.8-196.2 |
| 74-61 | 40.0 | 15.0 | 33.8 | 84.5 | 195.2-196.4 |
| 74-62 | 40.0 | 22.5 | 30.9 | 77.5 | 197.8-198.4 |
| 74-63 | 40.0 | 26.5 | 28.7 | 72.0 | 197.0-197.8 |

Table VI illustrates the same effect when an alcohol of higher molecular weight is employed. In each run, 40 grams of crude cholic acid were employed:

*Table VII*

| Run | Vol. of Toluol (ml.) | Vol. of n-Butanol (ml.) | Recovery | | Melting Point (° C.) |
|---|---|---|---|---|---|
| | | | Wt. (g.) | Percent | |
| 74-53 | 40.0 | 18.0 | 33.1 | 82.5 | 193.0-195.0 |
| 74-54 | 40.0 | 36.0 | 28.9 | 72.5 | 195.4-197.6 |
| 74-55 | 40.0 | 54.0 | 26.6 | 65.5 | 195.0-196.6 |
| 74-56 | 40.0 | 63.0 | 25.0 | 62.5 | 195.4-197.0 |

Table VIII is intended to illustrate the importance of reducing to a minimum the amount of moisture, apart from water of crystallization, which is contained in the crude cholic acid before the purification step according to the invention. In each run, 10 milliliters of methanol were used:

*Table VIII*

| Run | Wt. (dry basis) of crude cholic acid | Amount of Moisture (Percent) | Vol. of Toluene (ml.) | Recovery | | Melting Point (° C.) |
|---|---|---|---|---|---|---|
| | | | | Wt. (g.) | Percent | |
| 185-A | 40.0 | 6.19 | 40 | 36.7 | 91.6 | 192-194 |
| 185-B | 40.0 | 6.19 | 40 | 36.9 | 92.4 | 192.194 |
| 204-A | 50 | 11.8 | 53 | 49.0 | 98.0 | 190-193 |
| 205-B | 50 | 25.0 | 53 | 50.4 | 100.8 | 189-193 |

The table illustrates that when the amount of moisture based on the weight of the dry crude cholic acid apart from water crystallization substantially exceeds 5% the method according to the invention does not produce a cholic acid which has a sufficiently high melting point to be commercially acceptable.

Varying factors, such as the characteristics of the starting material and the type of handling in the various steps of the bile processing, may necessitate further purification of the cholic acid prepared by the process according to the invention; in particular it may be necessary to make provision for more thorough removal of bile pigments by suitable methods, for example, by employing decolorizing charcoal or earths. The additional removal of bile pigments may be carried out before or after the purification step according to the invention. Furthermore, a further leaching of the product of the purification step with the mixture of the alcohol and the fatty acid solvent according to the invention will result in a product of greater purity where such is required. Alternatively, conventional methods of further purification may be employed.

The following examples are illustrative of the invention. The bile acid material which forms the starting material in Examples I to VIII is crude cholic acid containing cholic acid which was precipitated after saponification and by subsequent acidification of concentrated bile and from which desoxycholic acid was separated by the above mentioned Paterson process. Example IX relates to the application of the process according to the invention to the bile acid material precipitated after saponification and by subsequent acidification of concentrated bile.

*Example I*

One hundred pounds of dry, pulverized crude cholic acid, obtained by saponifying concentrated bile, acidifying, and separating the cholic acid from desoxycholic acid by the morpholine process disclosed in the above-mentioned patent application, was leached with a mixed solvent made up of 10 gallons of toluene and 8.5 litres of methanol. The solvent was poured into the powdered cholic acid in a 30 gallon tank and stirred well for a few minutes with a wooden paddle. The slurry was very fluid at first, then it started to thicken. After standing for a day at room temperature the crystalline product was removed on a centrifuge, and the batch was split into two parts for the usual washing with the solvents.

One part was washed with 5 litres of a 12:1 mixture of toluene and methanol by spraying the filter cake carefully with the solvent to ensure that all parts of the cake were in contact with the solvent. The product weighed 49.8 lbs. and had a melting point of 194–196° C.

The other part was first washed in the same manner with 6 litres of the 12:1 mixture of toluene and methanol and then with 5 litres of toluene. The product weighed 39.8 lbs.; the melting point being 194.5–196° C. The total yield was 85% based on the weight of the crude starting material.

To remove slight traces of bile pigments, the second part was taken up in 95% ethanol in the ratio of 7 milliliters per gram and treated with 10% by weight of activated charcoal. The charcoal was removed and the solution evaporated to recover the alcohol until a heavy syrup and crystallization resulted. Sodium hydroxide solution was carefully added until a clear solution was obtained, and the sodium cholate solution was diluted with hot water. The cholic acid was then recovered by the addition of dilute HCl; a white light powdery product was produced.

In order to improve the melting point 40.0 grams of the cholic acid produced after treatment with the charcoal was leached again with a mixed solvent consisting of 55 milliliters of toluene and 5.5 milliliters of methanol for 24 hours at room temperature. The crystalline product was filtered off, washed with 10 milliliters of 12:1 toluene-methanol and dried at 80° C. for 4 hours. The recovered material weighed 38.1 grams and had a melting point of 196.5–199° C.

Example II

In this run the pigments were removed from the crude starting material before carrying out the method according to the invention. Forty grams of crude dry cholic acid similar to that employed as the starting material in Example I were taken up in 95% ethanol (7 milliliter/gram) and charcoaled with 4.0 grams of activated charcoal. After the charcoal was removed the alcohol was distilled down until the volume of solution was about 100 milliliters. One hundred milliliters of 5% NaOH and 200 milliliters of water were then added and the crude charcoaled cholic acid was precipitated with dilute HCl. The recovery after drying was 37.0 grams.

This material was leached with 10 milliliters of methanol and 40 milliliters of toluene at room temperature. The cholic acid was filtered off, washed with 12:1 mixture of toluene and methanol and dried. The yield was 32.8 grams (82%) of cholic acid having a melting point of 196–199° C.

Example III

Forty grams of crude cholic acid similar to that employed as the starting material in Example I were pulverized and then treated with a mixed solvent made up of 40 milliliters of ethylene dichloride and 7.5 milliliters of methanol. The cholic acid was mixed thoroughly with the solvent and allowed to stand for 24 hours at room temperature. The crystalline material (cholic acid-methanol molecular compound) was removed on a filter, and washed with the same solvent mixture until no more color appeared in the washings. This required approximately 40 milliliters. The product was air-dried at room temperature. The yield was 33.9 grams (84.8%) of cholic acid having a melting point of 195–200° C.

Example IV

Example III was repeated except that 7.5 milliliters of n-propyl alcohol were substituted for methanol and 40 milliliters of toluene were substituted for ethylene dichloride. The yield was 35.2 grams (88%) of cholic acid, having a melting point of 193–196° C.

Example V

Example III was repeated using 40 milliliters of ethyl ether instead of ethylene dichloride. The yield was 33.9 grams (84.8%) of cholic acid, having a melting point of 196–200° C.

Example VI

Example III was repeated using 15 grams instead of 7.5 milliliters of methanol and 80 milliliters of toluene instead of 40 milliliters of ethylene dichloride. The yield was 35.3 grams (88.4%) of cholic acid, having a melting point of 197–200° C.

Example VII

Example VI was repeated, except that 7.5 milliliters of methanol were employed with 80 milliliters of toluene. The yield was 37.1 grams (92.7%) of cholic acid, having a melting point of 196–198.5° C.

Example VIII

Forty grams of crude cholic acid were pulverized and then treated with a mixed solvent made up of 40 milliliters of chlorobenzene and 7.5 milliliters of methanol. The cholic acid was mixed thoroughly with the solvent and allowed to stand overnight at room temperature. The crystalline material was filtered off, washed and dried. The yield was 36.1 grams (90.4%) of cholic acid, having a melting point of 195.4–196.8° C.

Example IX

A quantity of crude bile acids, which had been prepared by saponification of bile, precipitated with acid and separated by filtration, was dried. The moisture content before drying was approximately 30%. The dry material was then reacted for a period of 18–20 hours with a 1:5.34 solvent mixture of methanol and toluene in the ratio of 95 milliliters of the solvent mixture to 80 grams of the dried bile material. The precipitate was filtered off and washed with a further quantity of the same solvent mixture and air-dried for 8 hours; it was then dried at 100° C. overnight. The recovery was at least 80% based on the weight of dry starting material. It will be noted that this yield depends on the amount of fatty acids present in the starting material, which are removed at this stage. This product was then subjected to a morpholine separation as disclosed in the Paterson patent applications referred to above to separate desoxycholic acid from cholic acid.

Also, any one of Examples I to VIII, inclusive, is entirely applicable to crude bile acids from which the desoxycholic acid has not been removed; and the yield of cholic acid after the desoxycholic acid has been separated from the resulting products is similar to those reported in the examples.

We claim:

1. In a process of recovering cholic acid from bile acid material obtained by saponification and subsequent acidulation of bile wherein said bile acid material is separated from the aqueous phase and dried so as to contain not substantially more than 5% free water, said bile acid material containing cholic acid and impurities including fatty acids, the steps which comprise, admixing said dry material with a mixture of a lower aliphatic alcohol ranging from methyl through n-butyl but not isobutyl alcohols and a fatty acid solvent miscible with said alcohol but in which cholic acid is substantially insoluble, the amount of said alcohol ranging between an amount equal to approximately 1 mole per mole of cholic acid in said material and approximately 30 milliliters per 40 grams of crude cholic acid in said material and the amount of said solvent being sufficient to dissolve said fatty acids, whereby a crystalline precipitate rich in cholic acid and a solution of impurities in said mixture is obtained, and separating said precipitate from said solution.

2. In a process of recovering cholic acid from bile acid material obtained by saponification and subsequent acidulation of bile wherein said bile acid material is separated from the aqueous phase and dried so as to contain not substantially more than 5% free water, said bile acid material containing cholic acid and impurities including fatty acids, the steps which comprise, admixing said dry material with a mixture of a lower aliphatic alcohol ranging from methyl through n-butyl but not isobutyl alcohols and a fatty acid solvent miscible with said alcohol but in which cholic acid is substantially insoluble, the amount of said alcohol ranging between an amount equal to approximately 1 mole per mole of cholic acid in said material and approximately 30 milliliters per 40 grams of crude cholic acid in said material and the amount of said solvent being sufficient to provide a ratio of alcohol to solvent between approximately 1 to 40 and 1 to 1¼, whereby a crystalline precipitate rich in cholic acid and a solution of impurities in said mixture is obtained, and separating said precipitate from said solution.

3. In a process of recovering cholic acid from bile acid material obtained by saponification and subsequent acidulation of bile wherein said bile acid material is separated from the aqueous phase and dried so as to contain not substantially more than 5% free water, said bile acid material containing cholic acid and impurities including fatty acids, the steps which comprise, admixing said dry material with a mixture of a lower aliphatic alcohol ranging from methyl through n-butyl but not isobutyl alcohols and a fatty acid solvent miscible with said alcohol but in which cholic acid is substantially insoluble, the amount of said alcohol being about 2 moles per mole of cholic acid in said material and the amount of said solvent being about 40 milliliters per 40 grams of crude cholic acid in said material, whereby a crystalline precipitate rich in cholic acid and a solution of impurities in said mixture is obtained, and separating said precipitate from said solution.

4. In a process of recovering cholic acid from bile acid material obtained by saponification and subsequent acidulation of bile wherein said bile acid material is separated from the aqueous material and dried so as to contain not substantially more than 5% free water, said bile acid material containing cholic acid, a lesser amount of desoxycholic acid and impurities including fatty acids, the steps which comprise, admixing said dry material with a mixture of a lower aliphatic alcohol ranging from methyl through n-butyl but not isobutyl alcohols and a fatty acid solvent miscible with said alcohol but in which cholic acid is substantially insoluble, the amount of said alcohol ranging between an amount equal to approximately 1 mole per mole of cholic acid in said material and approximately 30 milliliters per 40 grams of crude cholic acid in said material and the amount of said solvent ranging from approximately 40 milliliters to 160 milliliters per 40 grams of crude cholic acid in said material, whereby a crystalline precipitate rich in cholic acid and a solution of impurities in said mixture is obtained, separating said precipitate from said solution, and thereafter removing desoxycholic acid from said precipitate to recover purified cholic acid.

5. In a process of recovering cholic acid from bile acid material obtained by saponification and subsequent acidulation of bile wherein said bile acid material is separated from the aqueous phase and dried so as to contain not substantially more than 5% free water, said bile acid material containing cholic acid and impurities including fatty acids, the steps which comprise, admixing said dry material with a mixture of methyl alcohol and a fatty acid solvent miscible with said alcohol but in which cholic acid is substantially insoluble, the amount of said alcohol ranging between an amount equal to approximately 1 mole per mole of cholic acid in said material and approximately 30 milliliters per 40 grams of crude cholic acid in said material and the amount of said solvent ranging from approximately 40 milliliters to 160 milliliters per 40 grams of crude cholic acid in said material, whereby a crystalline precipitate rich in cholic acid and a solution of impurities in said mixture is obtained, and separating said precipitate from said solution.

6. In a process of recovering cholic acid from crude cholic acid obtained by saponfication and subsequent acidulation of bile to produce a bile acid material containing cholic acid, desoxycholic acid, and impurities including fatty acids, separating said desoxycholic acid from said cholic acid and said impurities, and drying said crude cholic acid so that it contains not substantially more than 5% free water, the steps which comprise, admixing dry crude cholic acid with a mixture of a lower aliphatic alcohol ranging from methyl through n-butyl but not isobutyl alcohols and a fatty acid solvent miscible with said alcohol but in which cholic acid is substantially insoluble, the amount of said alcohol ranging between an amount equal to approximately 1 mole per mole of cholic acid in said crude cholic acid and approximately 30 milliliters per 40 grams of said crude cholic acid and the amount of said solvent ranging from approximately 40 milliliters per 40 grams of said crude cholic acid, whereby a crystalline precipitate rich in cholic acid and a solution of impurities in said mixture is obtained, and separating said precipitate from said solution.

References Cited in the file of this patent

UNITED STATES PATENTS

| Number | Name | Date |
|---|---|---|
| 2,438,232 | Sifferd | Mar. 23, 1948 |